Oct. 19, 1965 R. A. LONG 3,213,337

COMPOSITE CERAMIC BODY AND METHOD OF FORMING THE SAME

Filed Oct. 2, 1962

INVENTOR.
ROGER A. LONG
BY Lyon & Lyon
ATTORNEYS

United States Patent Office 3,213,337

Patented Oct. 19, 1965

3,213,337

COMPOSITE CERAMIC BODY AND METHOD OF FORMING THE SAME

Roger A. Long, Escondido, Calif., assignor to Whittaker Corporation, a corporation of California Filed Oct. 2, 1962, Ser. No. 227,927
17 Claims. (Cl. 317—234)

This application is a continuation-in-part of applicant's earlier filed United States application Serial No. 61,353, filed October 10, 1960, and now United States Patent No. 3,131,073, issued April 28, 1964.

The present invention relates to composite ceramic bodies and method of forming the same. More particularly the present invention relates to a composite ceramic body suitable for use as a semiconductor package and to the method of forming the same.

Conventionally, semiconductors, such as transistors, are enclosed in a metal body having glass seals around the metal leads connected to the semiconductor. Such packages have poor overall thermal conductivity, whereby operating semiconductors become increasingly hotter during use until, in some cases, a temperature is reached at which the characteristics of the semiconductor are so altered as to adversely affect the electrical system of which the semiconductor is a part.

A further disadvantage of known packages for semiconductors has been gas leakage or transfer between the interior of the semiconductor package and the surrounding atmosphere. Such transfer results from the changing temperature conditions within the semiconductor package and the exterior environment and is permitted either by the porosity of the principal packaging material, if other than metal, or a breakdown of the integrity of the seal between the metal leads and the main portion of the semiconductor package. A particular difficulty encountered in metal packages utilizing glass seals has been the variation in the coefficient of thermal expansion between the metal and the glass seal resulting in either a breaking of the glass or a separation of the glass from either the metal lead or the metal case.

The problems encountered by the art in packaging transistors or other semiconductors similarly exist in other fields wherein thermal conductive bodies, having low or no porosity and having coefficients of thermal expansion comparable to the metals with which they are in contact, are required.

It is accordingly an object of the present invention to provide such a thermal conductive body.

It is a further object of this invention to provide a composite ceramic body and a method of forming the same which is suitable for use in packaging semiconductor elements.

It is a more particular object of the present invention to provide a substantially nonporous ceramic body which is a mixture of a metal oxide and a pyrophosphate-oxide eutectic.

It is a further object of the present to provide a packaged semiconductor which will be operative over extremes of heat, pressure and adverse exterior environmental conditions.

Other objects and advantages will, it is believed, be readily apparent to those skilled in the art from the following detailed description of a preferred embodiment of the present invention when taken in connection with the accompanying drawings in which FIG. 1 is an exploded view of a semiconductor package in accordance with the present invention.

Generally, the present invention contemplates the formation of a metallic pyrophosphate-metallic oxide eutectic characterized by its ability to bond with metallic leads and subsequently combining the eutectic with a refractory metal oxide characterized by being wetted by the eutectic to form a composite ceramic body having high thermal conductivity and low porosity.

The eutectic composition, which acts as a binder in the composite ceramic body, is formed by the blending of a metallic pyrophosphate having the general formula $M_1(P_2O_7)$ with a metallic oxide $M_2O$. The by weight proportions of the pyrophosphate and the oxide are selected such that the eutectic will be formed when the blended mixture is heated to or above its melting point. The resulting eutectic has the idealized formula $$M_2O\text{-}M_1(P_2O_7)$$

The selection of the particular oxide and metal pyrophosphate used in forming the eutectic composition is determined by the ability of the resulting eutectic to wet the oxide and to wet and bond with a metallic wire suitable for use as an electrical lead in a transistor package. The nature of the bond formed by the eutectic with such metallic leads is not fully understood. It is believed that a chemical reaction occurs between the eutectic and the metal lead surface due to an interchange of atoms. It is possible that the action is one of transference of oxygen to the metal, oxidation of the metal, and the dissolving of the oxidized metal portion in the eutectic. In any event, it is known that the eutectic must "wet" the lead without chemically destroying it to form a bond between the eutectic and the lead.

Figure 4:
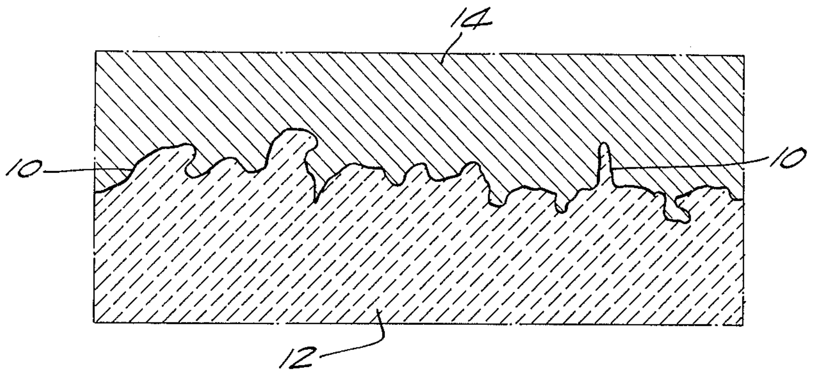
FIG. 4 is an idealized enlargement illustrating the metal-body interface.

FIG. 4 is illustrative of a highly magnified microphotograph of the interface 10 thus formed between the eutectic 12 and the metal lead 14. Typical of the metallic cations ($M_1$ and $M_2$) which give a eutectic capable of wetting or bonding with conventional metallic leads are those selected from the group consisting of manganese, magnesium, aluminum, beryllium, chromium, hafnium, zirconium, iron and titanium. In selecting the particular oxide and pyrophosphate used in forming the eutectic, consideration must also be given to the chemical composition of the metal lead to be used. Some combinations of eutectic mixtures and metal leads may react sufficiently to either destroy the metal lead or to form a metal-eutectic complex having poor conductivity. Thus it may be necessary to use different metal leads with different eutectic compositions to obtain optimum electrical conductivity.

Within the framework of the conditions above stated any metallic oxide ($M_2O$) may be combined with a metallic pyrophosphate ($M_1P_2O_7$) in eutectic proportions to form the binder in the composite ceramic body.

In order to give to the resulting ceramic body sufficiently high strength and thermal characteristics to be suitable for use in semiconductor packages, the eutectic is blended with a refractory metallic oxide. The selection of the metallic oxide is determined by the thermal characteristics desired in the resulting composite body and the ability of the eutectic to wet the oxide as otherwise the resulting composite has poor strength characteristics, is brittle or may crumble under shock. The oxide added to the eutectic may be the same oxide used in forming the eutectic. However, satisfactory semiconductor packages may be formed using any other oxide wetted by the eutectic. For example, beryllium oxide may be used with a $MgO\text{-}Mn_2P_2O_7$ eutectic. Again, consideration must be given to the metal lead to be used to avoid destruction of the lead by the eutectic mixture.

The thermal conductivity of the oxide is a principal consideration in both the selection of the oxide and the selection of the eutectic components. For example, BeO and MgO have high thermal conductivity. Such oxides are wetted by such eutectics as $MgO\text{-}Mn_2P_2O_7$ and $MgO\text{-}Mg_2P_2O_7$. These eutectics also bond readily with or wet conventional semiconductor metallic leads so that when such oxides are blended with these eutectics, an excellent semiconductor package may be formed. It is this interrelation of thermal conductivity of the refractory oxide and wetting ability of the eutectic both with respect to the oxide and the selected metal lead which determines the composition of the composite ceramic body.

Two further factors must be considered in formulating the composite ceramic body, first, the relation between the rate of expansion of the composite and the selected metal lead upon change of temperature and second, the porosity of the body itself.

The coefficient of thermal expansion of the composite is of course related to its composition both in regard to the ratio of oxide and eutectic used and the selection of the particular compounds. The rate of expansion, i.e., change in volume with respect to temperature, of the metal leads is a function both of the coefficient of thermal expansion of the lead used and the cross-sectional area thereof. Accordingly, in formulating the ceramic composite, consideration must be given both to the chemical nature and to the size of the metal leads to be used in order that the composite may have a coefficient of thermal expansion sufficiently close to that of the metal lead to prevent weakening or destruction of the bond therebetween on temperature cycling.

The porosity of the body itself is also related to its composition and in addition, to the method of forming the body, as will be shown hereinafter. With respect to the effect of composition on porosity, the composite is in the nature of a solid suspension wherein the eutectic is the continuous phase and the refractory oxide is the discontinuous phase. If too much oxide is used in relation to the wetting characteristics of the eutectic, the continuous phase will not be formed and excessive porosity will result. Thus the by weight ratio of the oxide and eutectic in the composite is again related to the eutectic's ability to wet the oxide. If excessive amounts of oxide are used, the continuous phase will not form and both poor porosity and strength characteristics will result. If too little oxide is used, the resulting composite will assume the thermal and strength characteristics of the eutectic giving an unsatisfactory package.

To the eutectic-oxide composite may be added fillers of various kinds compatible with the composite. For example, sodium metaphosphate can be added to the ceramic eutectic to reduce the fusing temperature thereof so as to permit wetting of the metal leads at temperatures at which a particular lead is metallurgically stable.

The composite ceramic body is formed by first blending eutectic proportions of the oxide and pyrophosphate to form a substantially homogeneous mixture, heating the mixture above its melting point to form the eutectic, quenching the molten eutectic and then grinding and screening the quenched eutectic to a suitable particle size. If the eutectic is formed in a platinum or like crucible, the quenched ground eutectic may then be mixed with the selected oxide. If a graphite or other carbon crucible is used, it is necessary to reheat the powdered eutectic in oxygen to burn out the carbon impurities. The processed eutectic is comminuted and then mixed with a selected powdered oxide and blended as in a ball mill. The resulting mixture is then placed in a die of desired shape and form and pressed under suitable pressure and temperature conditions. Generally, cold pressing is satisfactory in which case pressures of around 60,000 p.s.i. may be used. Other pressure and temperature conditions may be utilized which give a pressed form which may be handled. However, the porosity of the resulting body may be effected by both the techniques of preforming and subsequent sintering. If a sufficiently compact preform is not obtained, the resulting sintered piece may have a higher porosity than desired. In this case, higher pressures must be used prior to sintering to reduce the porosity. Further, sintering temperature must be controlled to obtain minimum porosity. If the preformed body is subjected to too wide a temperature range, a uniform distribution of the eutectic continuous phase cannot be obtained increasing the porosity of the resulting composite.

The resulting preformed solid bodies are sintered at fusing temperature (i.e., a temperature above the melting point of the eutectic but below that of the oxide) for a time sufficient to form a homogeneous sintered body. The resulting composites are then cooled and have been found to have high strength, low porosity and excellent thermal conductivity.

Figures 1, 2, 3:
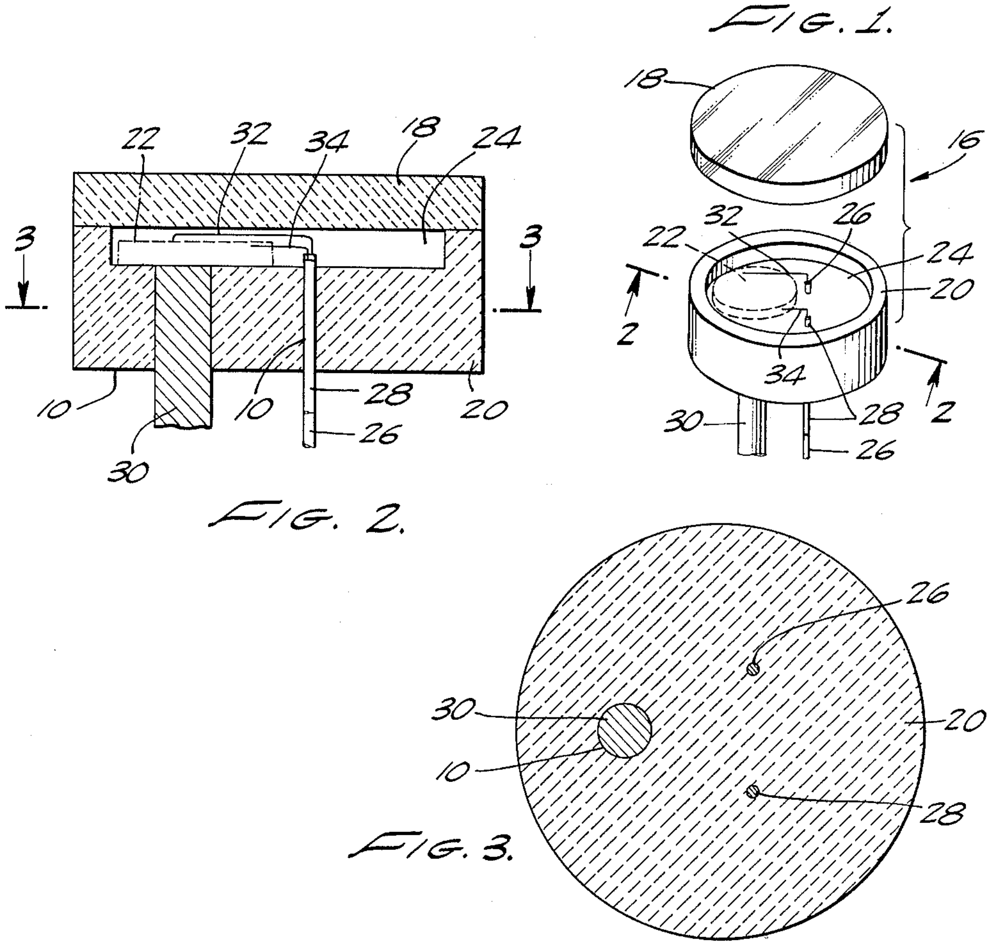
FIG. 2 is a sectional view of such package taken substantially along the line 2—2 of FIG. 1.
FIG. 3 is a sectional view of such package taken substantially along the line 3—3 of FIG. 2.

Referring now to the drawings, there is shown in FIG. 1 a transistor package 16. This package includes a cover 18 which may be formed in the manner above described, and a body 20. Within the body there is shown in phantom a semiconductor 22. The body 20 is provided with a recess 24 to receive the transistor. Carried by the body and moulded thereinto are a pair of electrical leads 26 and 28 and a base connection 30. Soldered to the ends of the leads 26 and 28 within the recess 24 is a first semiconductor wire (emiter) 32 and a second semiconductor wire (collector) 34.

The body 20 is formed in the same manner as the cover 18, the leads 26 and 28 being positioned within the forming die prior to initial pressing. Some metallic leads oxidize rapidly in air at the sintering or fusing temperature and it is therefore necessary that an inert atmosphere such as argon or helium be used or that sintering occur in a partial vacuum.

The cover 18 and body 20 may be united using any suitable ceramic or metallizing adhesive to complete the package. The semiconductor package thus formed is substantially nonporous preventing transfer of gas between the recess 24 and the environment exterior thereto, even along the interfaces between the leads 26 and 28, the base connection 30 and the surrounding composite ceramic materials.

The following are specific examples of the method of forming the eutectic and the composite ceramic body.

In these examples commercial grade chemicals are used unless otherwise indicated and the ratios, percentages, etc. indicate parts by weight.

EXAMPLE NO. I

A eutectic was prepared from a mixture of 0.95 ounce of MgO and 19.05 ounces of $Mn_2P_2O_7$ (eutectic composition: 4.75% MgO, 95.25% $Mn_2P_2O_7$). The materials were first weighed and then blended by tumbling on a ball mill rack for one hour. Eight ounces of the resulting blended mixture were then placed in a platinum crucible and reacted at 2004° F. in a furnace to form the eutectic. The temperature of the furnace was then raised to 2150° F. and the molten eutectic quenched in water. The quenched eutectic was then ground and screened to −325 mesh.

Six ounces of the ground and processed eutectic $MgO\text{-}Mn_2P_2O_7$ were then mixed with 14 ounces of magnesium oxide which had been previously comminuted to approximately 200 mesh. The mixture was then blended by tumbling on a ball mill rack for four hours.

The cover for a semiconductor container was formed by introducing a sufficient amount of the resulting blended mixture to fill a die of predetermined shape and form. The cover was first preformed by subjecting the material to 60,000 p.s.i. The preformed cover was then removed from the die and sintered at 2095°±5° F. for twenty minutes in air. The resulting solid body was cooled and tested with a helium leak detector for porosity. The body passed $2 \times 10^{-10}$ cc. of helium per second.

The container body was formed as follows: The oxide-eutectic mixture was placed in a die having positioned therein the necessary electrical leads and base connection. The electrical leads and base connection were formed from a Kovar alloy, the chemical composition of which was approximately 54% iron, 24% nickel and 18% cobalt. The body was pressed at 60,000 p.s.i., removed from the die and sintered at 2095°±5° F. for twenty minutes in an argon atmosphere. The resulting body was cooled and was tested on a helium leak detector. The body passed $10^{-8}$ cc. of helium per second.

Subsequently, the package was cut with a diamond blade to obtain microphotographs of the interface between the lead wire and the ceramic body. FIG. 4 is illustrative of the resulting microphotographs.

The steps of Example I were repeated using eutectics from MgO and BeO in combination with $Mg_2P_2O_7$ and using BeO and MgO in varying amounts as the refractory oxides. Eutectic forming and sintering temperatures were varied as dictated by the eutectic composition and the ratio of eutectic to oxide. In all cases satisfactory semiconductor packages were formed. It was further determined that the amount of BeO or MgO combined with the $MgO\text{-}Mn_2P_2O_7$ eutectic could be varied from 60 to 80% without adversely affecting the temperature or porosity characteristics of the packages.

The ability of various eutectics to wet typical metal leads was determined under various protective gases. The results are set forth in Table I.

*Table 1*

| Eutectic | Kovar Argon | Kovar Vacuum | Kovar Air | Monel Argon | Preoxidized Nickel Argon | Inconel Argon | Tungsten Argon | Stainless Steel Argon | "René" 41 Argon | Tungsten Hydrogen |
|---|---|---|---|---|---|---|---|---|---|---|
| OA | Good | Poor | Good | | Good | Good | Fair | Good | Good | Good. |
| OB | do | Good | do | Poor | do | do | Good | Fair | do | Do. |
| OC | do | do | do | do | do | Poor | Fair | do | Fair | Do. |
| OG | do | do | do | Good | Fair | Fair | do | Good | do | Do. |
| OH | | Fair | | | | | | | | |
| OT | do | Good | do | do | Good | Good | Good | do | Good | Do. |
| OZ | do | Poor | Fair | Poor | | | | | | |

The compositions of the eutectics denominated in Table I as OA, etc., are as follows:

OA—7.5% $Al_2O_3$; 92.5% $Mn_2P_2O_7$
OB—5.5% BeO; 94.5% $Mn_2P_2O_7$
OC—7.5% $Cr_2O_3$; 92.5% $Mn_2P_2O_7$
OG—4.75% MgO; 95.25% $Mn_2P_2O_7$
OH—17.5% $HfO_2$; 82.5% $Mn_2P_2O_7$
OT—12.5% $TiO_2$; 87.5% $Mn_2P_2O_7$
OZ—11.0% $ZrO_2$; 89.0% $Mn_2P_2O_7$

Other pyrophosphate eutectics which have been determined are:

95% $TiP_2O_7$—5% $Al_2O_3$ (2400° F.)*
77.5% $TiP_2O_7$—22.5% $ZrO_2$ (2650° F.)
92% $Fe_4(P_2O_7)_3$—8% $Al_2O_3$ (2225° F.)
91% $Fe_4(P_2O_7)_3$—9% $ZrO_2$ (2090° F.)
90% $Mg_2P_2O_7$—10% $Al_2O_3$ (2400° F.)
85% $TiP_2O_7$—15% MgO (2225° F.)

* Eutectic temperature, approximate.

It will be apparent to those skilled in the art that the eutectic and oxide used in forming the composite are to be selected based upon the metal lead used, the thermal and porosity characteristics of the body desired and the ability of the selected eutectic to wet the selected oxide and metal lead. While some testing may be required to determine optimum composition and proportions, the same should present little difficulty in the light of the above disclosure.

Having fully described my invention, it is to be understood that I do not wish to be limited to the details set forth, but my invention is of the full scope of the appended claims.

I claim:

1. A composite ceramic semiconductor package comprising: a body portion and at least one metal lead bonded to said body portion; said body portion having high thermal conductivity and low porosity and being a sintered mixture of a eutectic and a refractory material; said eutectic having the general formula $$M_2O\text{-}M_1(P_2O_7)$$

where $M_2$ may equal $M_1$ and both are metallic cations, and being characterized by its ability to bond with said metal lead; said refractory material being a metal oxide capable of being wetted by said eutectic.

2. A composite ceramic material for use in forming a semiconductor package, said package having metal leads bonded therein, said ceramic material comprising: a mixture of a refractory material and a eutectic, said mixture, when sintered, being in the nature of a solid suspension wherein the eutectic is the continuous phase and the refractory material is the discontinuous phase; said eutectic being a mixture of a metal oxide and a metal pyrophosphate characterized in being capable of bonding with said metal leads; said refractory material being a metal oxide characterized in being wetted by said eutectic.

3. A composite ceramic material for use in forming a semiconductor package, said package having metal leads bonded therein, said ceramic material comprising: a mixture of a refractory material and a eutectic; said refractory material being selected from the group of metal oxides having high thermal conductivity; said eutectic having the general formula $M_2O\text{-}M_1(P_2O_7)$, where $M_1$ may equal $M_2$ and both are metallic cations, and being characterized by its ability to wet said refractory material and to bond with said metal leads whereby, upon fusing, a composite ceramic body having high thermal conductivity and low porosity will be formed.

4. A composite ceramic material for use in forming a semiconductor package, said package having metal leads bonded therein, said ceramic material comprising: a substantially homogeneous mixture of a particulate refractory material and eutectic; said eutectic having the general formula $M_2O\text{-}M_1(P_2O_7)$ and said refractory material having the general formula $M_3O$ where $M_1$ may equal $M_2$ may equal $M_3$ and $M_1$, $M_2$ and $M_3$ are metallic cations selected from the group consisting of manganese, magnesium, aluminum, beryllium, chromium, hafnium, zirconium, iron and titanium; said eutectic being characterized by its ability to wet said refractory material and to bond with said metal leads whereby, upon fusing, a composite ceramic material in the nature of a solid suspension is formed.

5. A composite ceramic semiconductor package comprising: a body portion and cover portion; said body and cover portions cooperating to define a semiconductor receiving space therebetween; at least one metal lead bonded in said package and communicating with said space; said body and cover portions being a composite ceramic material formed from a substantially homogeneous mixture comprising a particulate refractory material and a particulate eutectic; said eutectic being a mixture of a metal oxide and metal pyrophosphate in eutectic proportions, each of the cations of said oxide and pyrophosphate being a metal selected from the group consisting of manganese, magnesium, aluminum, beryllium, chromium, hafnium, zirconium, iron and titanium, said eutectic being characterized by its ability to wet said refractory material and to bond with said metal lead; said refractory material being a metal oxide, the cation of said oxide being a metal selected from the group consisting of manganese, magnesium, aluminum, beryllium, chromium, hafnium, zirconium, iron and titanium, said composite ceramic material being in the nature of a solid suspension wherein the eutectic is the continuous phase and the refractory material is the discontinuous phase.

6. A composite ceramic semiconductor package comprising: a body portion and a cover portion; said body and cover portions cooperating to define a semiconductor receiving space therebetween; a plurality of metal leads bonded in said package and communicating with said space; said body and cover portions being a composite ceramic material formed from a substantially homogeneous sintered mixture of magnesium oxide and a eutectic mixture of magnesium oxide and manganese pyrophosphate.

7. A composite ceramic semiconductor package comprising: a body portion and a cover portion; said body and cover portions cooperating to define a semiconductor receiving space therebetween; a plurality of metal leads bonded in said package and communicating with said space; said body and cover portions being a composite ceramic material formed from a substantially homogeneous sintered mixture of beryllium oxide and a eutectic mixture of magnesium oxide and manganese pyrophosphate.

8. A composite ceramic semiconductor package comprising: a body portion, said body portion having a recess therein; a base connection and a pair of metal leads bonded to said body portion; a semiconductor element within said recess electrically connected to said base connection and said metal leads; a cover portion joined to said body portion to effectively isolate said recess and semiconductor element; said body and cover portions being a composite ceramic material formed from a substantially homogeneous sintered mixture of 60 to 80 parts by weight magnesium oxide and 40 to 20 parts by weight of a eutectic mixture of magnesium oxide and manganese pyrophosphate, said connector and metallic leads being a ferric alloy consisting of approximately 54 parts by weight iron, 24 parts by weight nickel and 18 parts by weight cobalt.

9. A method of forming a composite ceramic semiconductor package having metallic leads carried thereby comprising: forming a eutectic having the general formula $M_2O\text{-}M_1(P_2O_7)$ where $M_2$ may equal $M_1$ and both are metallic cations, said eutectic being characterized by its ability to bond with said metal leads; blending said eutectic with a refractory metal oxide capable of being wetted by said eutectic, preforming said semiconductor package around at least a portion of said metallic leads and fusing said blended mixture at a temperature sufficient to sinter the same and to form a bond between the eutectic and the metal leads.

10. The method as claimed in claim 9 wherein the eutectic is a mixture of a metal oxide and a metal pyrophosphate where $M_2$ may equal $M_1$ and $M_1$ and $M_2$ are metallic cations from the group consisting of manganese, magnesium, aluminum, beryllium, chromium, hafnium, zirconium, iron and titanium and the cation of the refractory metal oxide is a metal selected from the group consisting of manganese, magnesium, aluminum, beryllium, chromium, hafnium, zirconium, iron and titanium.

11. A method of forming a composite ceramic semiconductor package having metallic leads carried thereby comprising: forming a eutectic from 4.75 parts by weight magnesium oxide and 95.25 parts by weight manganese pyrophosphate, blending 60 to 80 parts by weight magnesium oxide with 40 to 20 parts by weight of said eutectic to form a substantially homogeneous particulate mixture, preforming said package in predetermined shape by subjecting said latter mixture to pressure in a preforming die and fusing the resulting preformed package at a temperature of approximately 2095° F., said metallic leads having the following chemical composition in weight percent, 54% iron, 24% nickel and 18% cobalt.

12. The composite ceramic conductor package of claim 2 wherein $M_1$, is titanium and $M_2$ is aluminum.

13. The composite ceramic conductor package of claim 2 wherein $M_1$, is titanium and $M_2$ is zirconium.

14. The composite ceramic conductor package of claim 2 wherein $M_1$ is iron and $M_2$ is aluminum.

15. The composite ceramic conductor package of claim 2 wherein $M_1$ is iron and $M_2$ is zirconium.

16. The composite ceramic conductor package of claim 2 wherein $M_1$ is magnesium and $M_2$ is aluminum.

17. The composite ceramic conductor package of claim 2 wherein $M_1$ is titanium and $M_2$ is magnesium.

References Cited by the Examiner

UNITED STATES PATENTS

| | | | |
|---|---|---|---|
| 2,971,138 | 2/61 | Meisel et al. | 317—234 |
| 3,006,984 | 10/61 | Bol et al. | 174—50.61 X |
| 3,059,158 | 10/62 | Doucette et al. | 317—234 |
| 3,131,073 | 4/64 | Long | 106—39 |

DAVID J. GALVIN, *Primary Examiner.*

JAMES D. KALLAM, *Examiner.*